Feb. 13, 1968  J. R. CRISSEY  3,368,576
SINGLE LOCATION CHARGER
Filed Aug. 6, 1964  3 Sheets-Sheet 1

JACKSON R. CRISSEY
INVENTOR.

BY
H.C. Goldwire
AGENT

Feb. 13, 1968   J. R. CRISSEY   3,368,576
SINGLE LOCATION CHARGER
Filed Aug. 6, 1964   3 Sheets-Sheet 2
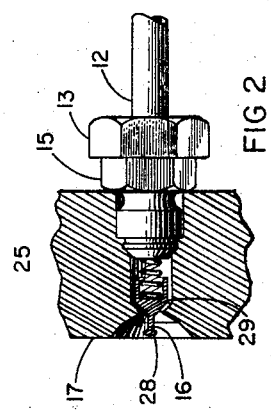
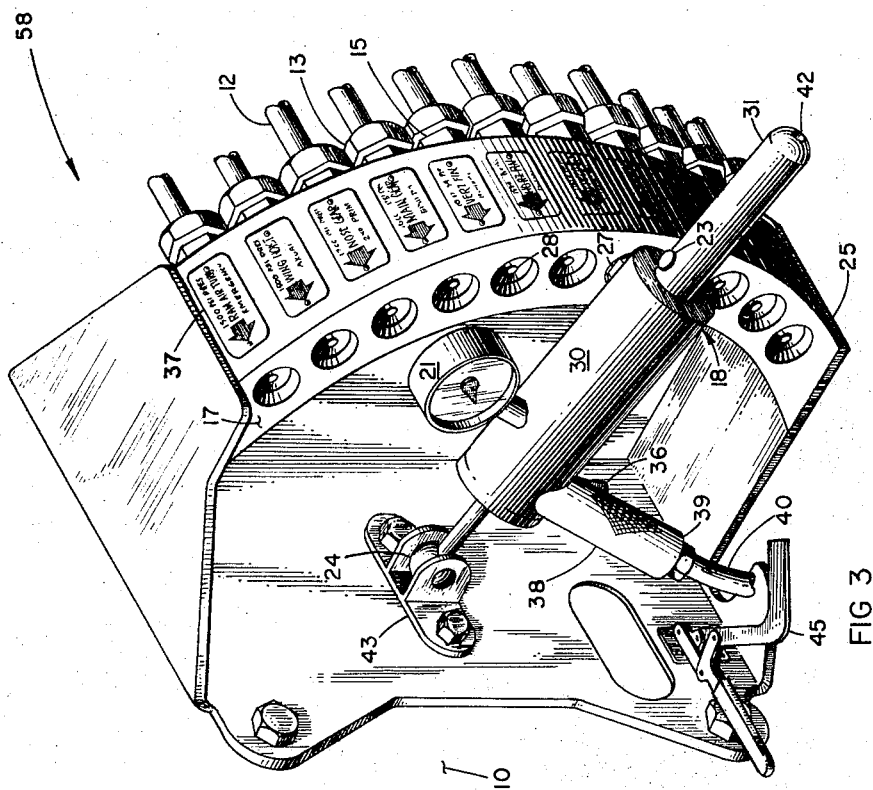
JACKSON R. CRISSEY
INVENTOR.
BY  H.C. Goldwire
AGENT Feb. 13, 1968  J. R. CRISSEY  3,368,576
SINGLE LOCATION CHARGER
Filed Aug. 6, 1964  3 Sheets-Sheet 3
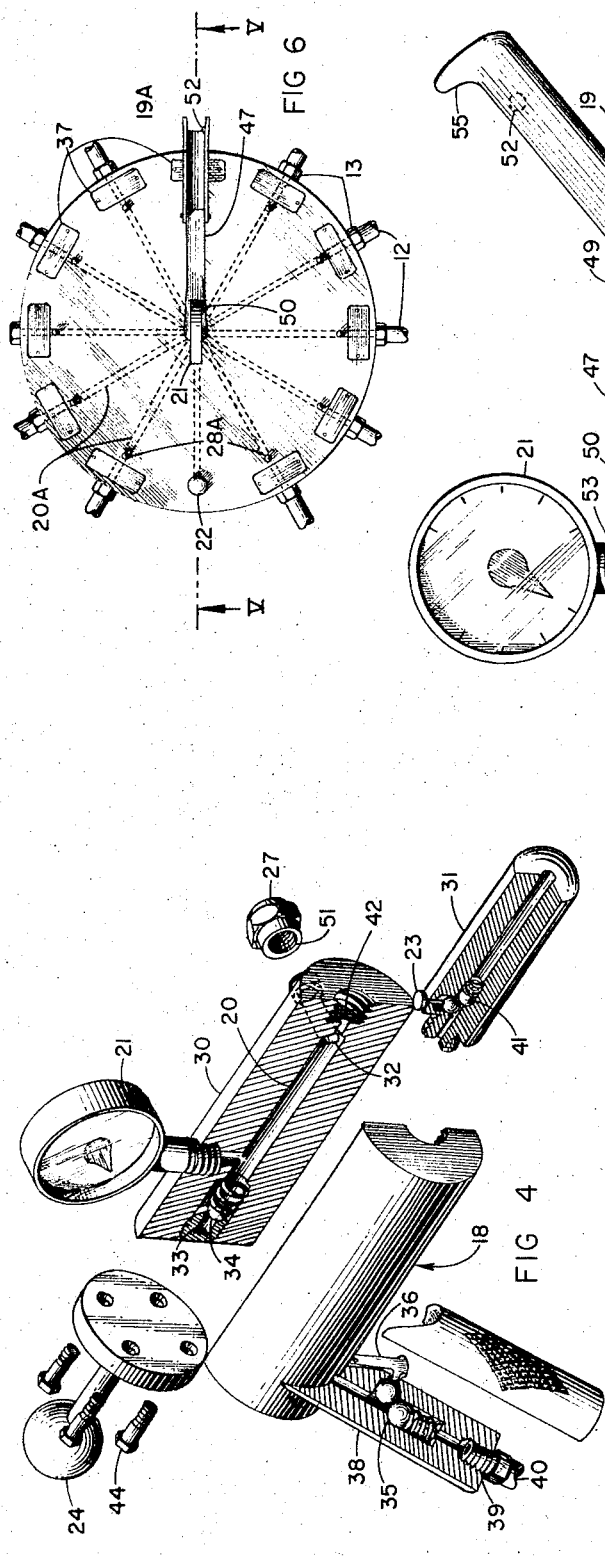
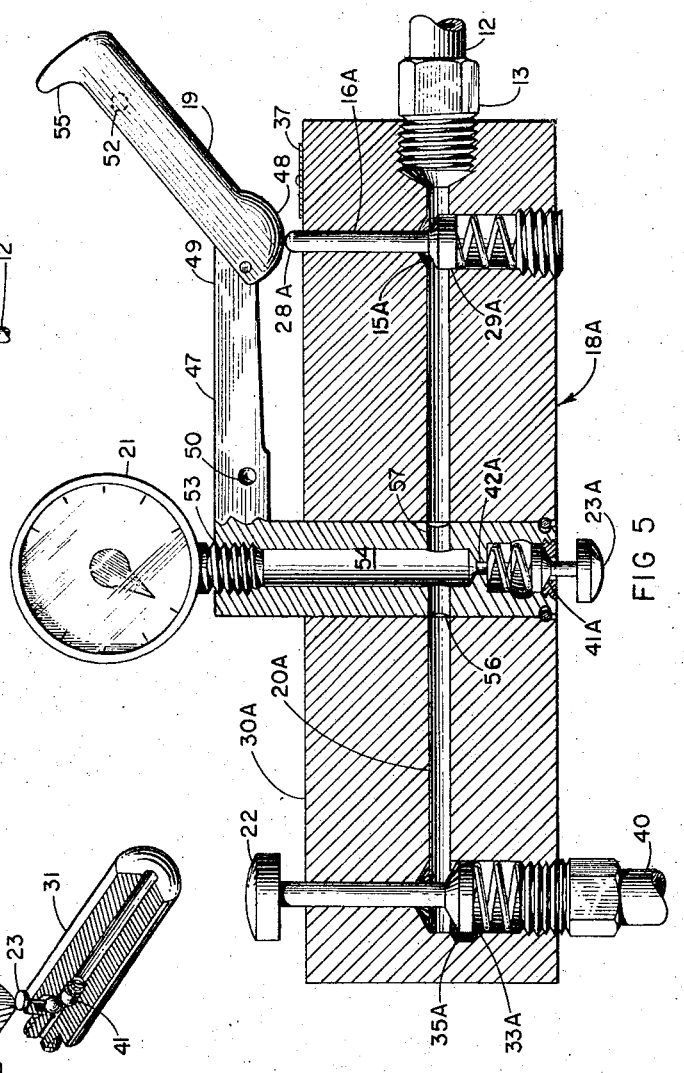
JACKSON R. CRISSEY
INVENTOR.
BY *H.C. Goldwire*
AGENT

United States Patent Office 3,368,576
Patented Feb. 13, 1968

3,368,576
SINGLE LOCATION CHARGER
Jackson R. Crissey, Dallas, Tex., assignor to Ling-Temco-Vought, Inc., Dallas, Tex., a corporation of Delaware
Filed Aug. 6, 1964, Ser. No. 387,853
14 Claims. (Cl. 137—1)

This invention relates to means and a method for the servicing of pressurized containers in aircraft, and more particularly to means for checking and regulating the pressure of the gas employed as the pressurizing agent in hydraulic accumulators and the like in aircraft.

All large, present-day aircraft, both military and commercial, utilize fluid systems to actuate most controlled devices and surfaces; for just as the advent of larger and faster automobiles spawned the area of power-assisted steering and power-assisted brakes, the advancement of aircraft already had generated the need for power-assisted controls. In today's complex, high-performance aircraft, the man-powered, direct mechanical linkage is usually too slow and too inadequate to supply the force needed for controlling an airplane in flight. Consequently, pumps provide fluids at high pressures that work in systems having fluid-energized actuators to supply the needed forces. The fluid systems, however, in particular the hydraulic systems, are not without their weaknesses. As is commonly known, a pressurized liquid system sustained by a cyclic pump is subject to pressure surge, pump failure and system cavitation. These characteristics of hydraulic systems are usually substantially overcome by including accumulators, storage bottles and the like in the systems. Such accumulators commonly have a liquid-filled compartment in communication with the hydraulic system and also a gas-filled compartment, the two compartments being separated by a movable partition such as a piston or a diaphragm; thus, the two compartments will always have the same pressure when the partition is free to move. The compressible gas is capable of smoothing out the peaks and valleys of pressure inherent in a pulsating liquid system by resisting momentary pressure increases and compensating for momentary pressure decreases. Accumulators of this type are also frequently used as sources of emergency power for individual devices in the event that the main hydraulic system is incapacitated. Such accumulators are usually located near the devices they are designed to actuate and therefore are scattered in diverse locations from the nose of the aircraft to the tail. Since each of these accumulators must be individually filled or "precharged" to a given pressure, each one has in the past been provided with its own filler fitting and gage. The precharge pressure for a typical, nitrogen gas-filled accumulator may be from 1,500 p.s.i. to over 3,000 p.s.i. and should be checked before each flight of the aircraft. Thus, in the past, provision had to be made for an access door or panel in the skin of the plane for each accumulator so that a ground support serviceman could reach the accumulator. The necessity for approximately ten or twelve access openings for the ten or twelve accumulators in a typical aircraft has been a major liability in itself, since doors and panels normally must be reinforced and strengthened more than simple skins, with a corresponding increase in aircraft weight. Likewise, manufacturing costs go up considerably when doors and panels must be fitted to openings in the skin with exacting tolerances. To illustrate this point, aerodynamic specifications often require that the gap between a skin opening and its associated door or panel be no more than 0.010 inch for supersonic aircraft. The use of such small tolerances usually means quite a bit of hand finishing must be done after the door is initially fabricated to an approximate size, which hand finishing, of course, is expensive. Another design consideration has been that the accumulator had to be placed near the surface of the aircraft so that when the access door was removed the accumulator would be readily accessible without requiring a service man to reach deeply into the aircraft. This means that the location of the accumulators has demanded a high priority and that other structural and service members have had to be designed around the accumulators; in other words, the positioning of an accumulator has, heretofore, been a deliberate and expensive process and has occasionally been an obstacle to the location of other nearby parts in an aircraft. A further and serious liability in having access doors and panels has been that they tend to preclude efficient use of the skin of an aircraft as a structural member. While some doors can carry a structural load, this is made possible only with an accompanying severe weight penalty in adding clamping devices, clips, bolts, screws, substructure, back-up plates and the like.

Another disadvantage of the prior art has been that to service each of, for example, ten accumulators required that a man open ten doors or panels which were scattered in diverse locations throughout the aircraft. Several hazards are inherent in this opening and closing of widely separated doors and/or panels including: (1) failing to check one of the ten accumulators because the service man became confused as to whether he had checked it, (2) failing to close a door securely, which failure might result in the door coming completely off during flight, or—even worse—coming only partially detached, which would interrupt the flow of air around the aircraft, produce an unpredictable drag, and interfere with control of the aircraft, (3) failing to close a door properly, which might damage or render inoperative the seal between the door and the opening, (4) the ever present possibility of negligently failing to replace a removable door or panel that has been temporarily removed from the aircraft, and (5) last but not least, the consuming of valuable time in terms of maintenance man hours (number of men X hours worked), as well as in terms of total elapsed time (hours worked) in preparing an aircraft for flight.

The problems of consumption of elapsed time and maintenance man hours alone or enough to make it desirable to find an improved way of checking the accumulators; for in the case of civilian aircraft, time can be synonymous with profit or loss, while in the case of military aircraft, time can be vital to the accomplishment of a mission and the saving of friendly lives. Consequently, it is a major object of this invention to reduce the time required to check and regulate the precharge pressure in an aircraft's accumulators.

Another object is to eliminate the necessity of having an individual gage connected to each accumulator.

A further object is to eliminate a large number of access doors and panels required for servicing scattered accumulators.

Yet another object is to make possible the placement of an accumulator in a location that is structurally beneficial but not necessarily conveniently accessible.

A still further object is to provide more flexibility in the design of aircraft members and devices that are normally located in the vicinity of the accumulators.

Still another object is to increase the usefulness of the aircraft's skin as a structural member.

An additional object is to decrease the possibility that a ground support serviceman might fail to inspect one or more accumulators or fail to securely close a door through confusion or lack of attention, time, energy, or initiative.

Other objects and advantages will be apparent from the specification and claims and from the accompanying drawing illustrative of the invention.

In the drawing:

FIGURE 2 is an enlarged view of a terminal end of one of the tubes of the apparatus of FIGURE 1;

FIGURE 3 is a perspective view of a movably mounted form of charger for the apparatus of FIGURE 1;

FIGURE 4 is an exploded view of the body of the charger of FIGURE 3;

FIGURE 5 is a diagrammatic view of a rigidly mounted charger for the apparatus of FIGURE 1; and FIGURE 6 is a plan view of the apparatus of FIGURE 5.

Figure 1:
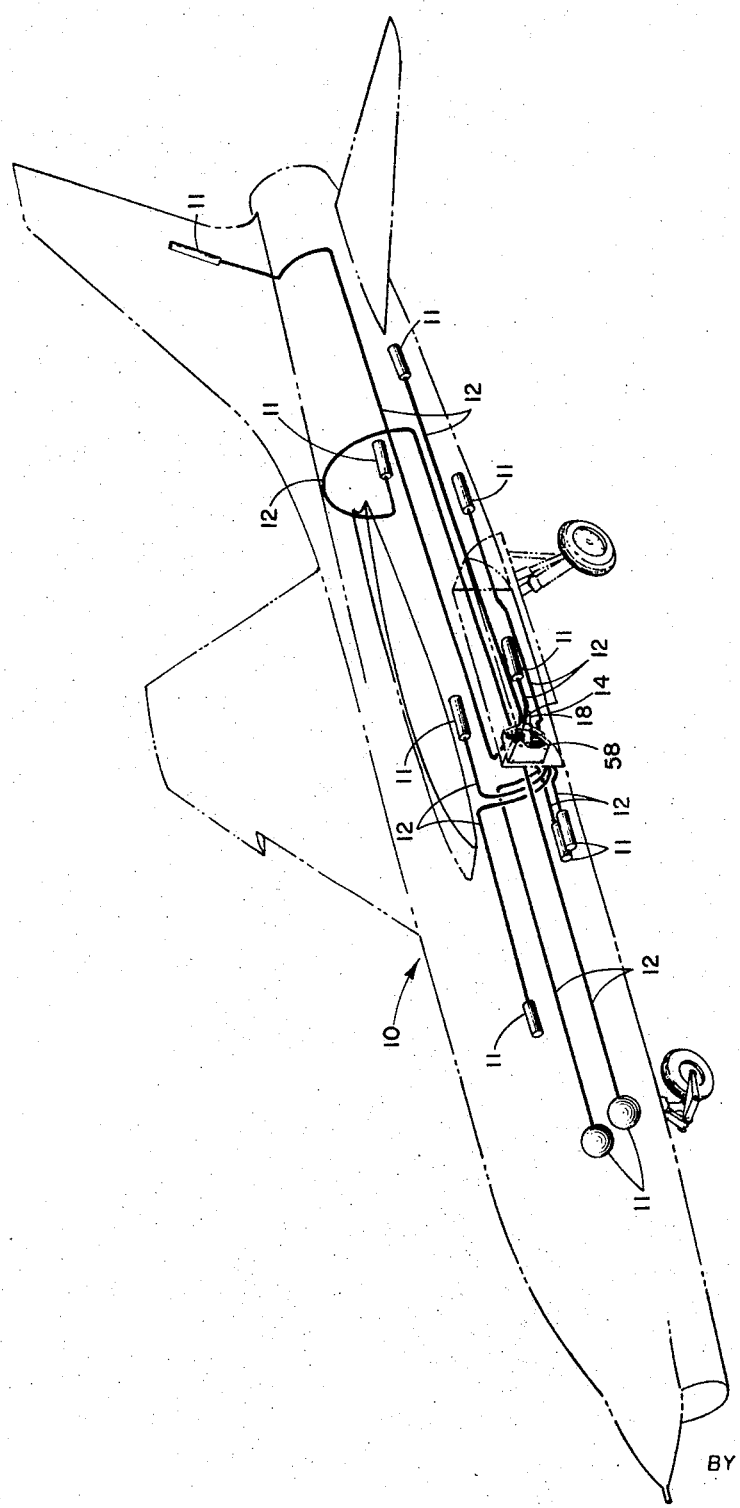
FIGURE 1 is a diagrammatic view showing a plurality of accumulators diversely mounted within an aircraft and connected with tubes served by a centrally located charger apparatus in accordance with this invention.

With initial reference to FIGURE 1, a typical aircraft 10 is shown with a nominal quantity of eleven hydraulic accumulators, surge dampers, and air bottles scattered throughout the aircraft. For convenience, all of these containers that store pressurized gas are referred to as accumulators 11. In the invention, a tube 12 is connected to the gas-filled compartment (not shown) of each accumulator 11. Each of said tubes 12 further has a terminal end 13, and all the terminal ends are gathered together and rigidly mounted in a symmetrical pattern at a predetermined location. This one location can be any place in the aircraft 10 deemed desirable; however, a preferred location is in an out-of-the-way but accessible corner of a wheel well 14, since any door which covers a wheel well is normally open when the aircraft is on the ground. Also, in case the aircraft 10 must be serviced during a rainstorm or some other foul weather, the shelter provided by an open wheel well 14 adds to the efficiency of the serviceman.

Since the tubes 12 of the invention provide "access" to each of the accumulators 11, there is no longer any significant restriction of the mounting location of the accumulators; they can be mounted behind, under, beside, within, in front of practically any part of the aircraft. This freedom in selecting mounting locations means that an accumulator 11 can be efficiently mounted directly on the strongest, nearby structural member without concern for a special mounting bracket to hold the accumulator in an accessible location. Likewise, other functional devices and structural members that are normally located in the vicinity of the accumulators 11 can be designed without having simultaneously to consider the proximity and accessibility of the accumulators. Besides allowing the accumulators 11 to be hidden almost anywhere, the access tubes 12 eliminate the need for access doors and panels in the surface of the aircraft 10 which were required in the prior art. Eliminating the need for access doors and panels has beneficial effects of many types, such as saving weight, saving manufacturing expense and time, increasing the usefulness of the aircraft's skin as a structural member, eliminating the time required to open and close doors or panels in servicing the aircraft, etc.

Connected to each similarly oriented terminal end 13 is a valve 15 (shown diagrammatically in FIGURE 2) which is normally closed, thereby retaining the gas present in the tube 12 and its accumulator 11, and which assembly can be opened to admit gas into the tube or release gas from it. This regulation of the flow of gas through a terminal end 13 is preferably accomplished with a valve 15 (of the type commonly found in the typical automobile tire inner-tube) having a spring-loaded stem or core 16 with a surface or base 29 that seats against the valve housing 17. A charger assembly 58 (FIGURE 1) is mounted at a fixed location on the aircraft 10 in the vicinity of the terminal ends 13 so that it may operate in cooperation with each of the similarly oriented valves 15 in checking and regulating the pressure in the accumulators 11. The plurality of valves 15, eleven valves in this example since there are eleven accumulators 11 with eleven tubes 12, are arranged in fixed, proximate relation to each other such that each is capable of being engaged and opened individually by a single element of the charger 18. The bulk of the charger 18 may be substantially fixed, having merely a movable element or handle that actuates an engaging or coupling means, or the entire charger may be movable to provide engagement. The valves 15 are all rigidly mounted in a single bracket 25 which has the contour of an arc of a circle whose center coincides approximately with the center of the swivel ball joint 24. With added reference to FIGURE 4, the radius of the arc on which the valves 15 lie is equal to the distance from the center of the swivel ball joint 24 to the orifice (not shown) of the nipple 27. Since all of the valves 15 are similarly oriented with the face 28 of each core 16 exposed, each valve may be individually actuated by pressing the rigid nipple 27 of the charger 18 against the face of the core to cause the base (not shown) of said core to unseat. The shape of the core face 28 and the shape of the nipple's orifice have such a relation to each other that pressing the nipple 27 against the face will not block off the flow of gas through the orifice; for while there must be a tight seal between the valve housing 17 and the outside of the nipple 27 when it is engaged, there must also be free communication between gas in the tube 12 and gas in the hollow nipple as long as it is engaged. A further advantage of this form of the invention is that only one tube 12 can be engaged at a time, which guarantees that there cannot be any transfer of gas from one tube to another. Thus, if the gas in one tube 12 becomes contaminated with vaporized oil, no other tubes need be affected. Inspecting the nipple 27 for any tell-tale residue of oil after it has been engaged with a valve 15 will enable a serviceman to verify that a system is still "clean" or uncontaminated.

The nipple 27 is mounted on and preferably protrudes from the rigid body 30 of the charger device 18 at a location such that the force required to unseat the core 16 of a valve 15 will be relatively small; for if the gas pressure in a tube 12 is 3,000 p.s.i., a force of 20 to 30 pounds may be required to unseat the core. Consequently, positioning the nipple 27 so that a mechanical advantage is employed to reduce the amount of physical effort expended in engaging a valve 15 is a further advantage of the invention. The preferred method of achieving such a mechanical advantage is to make the moment arm of the nipple 27 shorter than the moment arm of the handle 31 to reduce the force which must be applied by the man servicing the aircraft 10. Thus, with the elongated, rigid body 30 movably mounted at one end and a conveniently graspable handle 31 on the other end with the nipple 27 located between the two, a reduction in the necessary force is achieved in proportion to the relative distances of the nipple and the handle from the pivot point.

With reference to FIGURES 3 and 4, the rigid body 30 of the charger 18 has a chamber 20 which can be temporarily coupled with a tube 12 and its associated accumulator 11 by virtue of an orifice 32 which connects with the hollow nipple 27 and which extends through a side of the body 30 into the chamber 20. The volume of the chamber 20 is very small in comparison to the total volume of an accumulator 11 and its tube 12; hence, the pressure drop in the system caused by releasing accumulator pressure into the chamber can be considered negligible. Therefore, a gage 21 connected with the chamber 20 and indicating the pressure therein can be considered to be indicating the pressure in the engaged accumulator 11. A single gage 21 is installed on the charger 18 as shown, and this is an important advantage because it eliminates the necessity of having ten gages for ten accumulators, with attendant savings of cost and weight.

In addition to the orifice 32 in the rigid body 30 that provides communication with the bore 51 of the nipple 27, a first passage 33 opens into the chamber 20 and contains a spring-loaded check valve 34 that allows gas at a pressure greater than chamber pressure to enter said chamber but which will not allow gas to flow out of it. Located upstream from this check valve 34 is a first manually operated, spring-biased valve 35 which controls the release of high pressure gas from an external source (not shown); upon release, the high pressure gas flows through the check valve 34 and into the chamber 20. In its preferred form the manually operated valve 35 is actuated by one or more fingers of the operator depressing a small member 36 somewhat like a trigger which protrudes from the upstream part 38 of the body 30; this allows gas to flow past the valve 35 into the chamber 20. When the chamber 20 is in communication with a tube 12 and its associated accumulator 11, an increase of pressure in this chamber caused by admitting high pressure gas from the external source is accompanied by an increase of pressure in the accumulator. The same process can be repeated consecutively with each tube 12 until all of the accumulators 11 are pressurized or precharged to the desired pressure as indicated by the gage 21. A label 37 attached to the mounting bracket 25 over each valve 15 serves to identify the accumulator 11 connected to the other end of each tube 12 and to specify exactly what pressure should be obtained. Adding the shape of a pistol grip to the upstream part 38 of the rigid body 30 makes the charger 18 easy to hold and facilitates pressing the "trigger" 36, although this particular shape is not essential to the invention. The valve 35 which is actuated by the trigger 36 is like many common valves known in the art which function with a trigger-type, "on-off" control means, as shown in FIGURE 4. The end 39 of the pistol grip 38 is convenient for affixing any standard coupling used to connect a flexible line 40 from the external source of high pressure gas. The coupling, flexible line 40, and the tanks for storing and dispensing a gas such as nitrogen at high pressures are all standard items, well known in the art, and are not described herein.

While the most frequent type of regulation of the pressure in an accumulator 11 will be that of increasing the pressure by replacing gas that has been expended or lost, there may occasionally be times when the gas pressure is found to be too high. For instance, an increase in temperature may raise the pressure of the accumulator 11 above the design pressure, and it may be desirable to vent or bleed off some of the gas. This is most conveniently accomplished with a second manually operated, spring-biased bleed valve 41 (FIGURE 4) located in a second passage 42 in the rigid body 30 which connects the chamber 20 to the atmosphere. In its preferred form, this second valve 41 is similar in operation to the spring-loaded trigger valve 35 described above in that gas flows when a stem or button 23 is depressed and flow ceases when said stem or button is released. Bleeding of this high pressure gas into the atmosphere is safely done by locating the second passage 42 so that gas is discharged in a direction away from the serviceman.

The combination of the elements in the charger 18 and the tubes will not be so heavy as to be a severe weight liability in designing an aircraft 10. In the embodiment of the invention shown in FIGURES 3 and 4, the charger 18 is movably but permanently mounted in the aircraft 10. However, it is possible to employ the charger 18 as a piece of ground support equipment that is temporarily mounted on the aircraft each time it is to be used. The pivot bracket 43 shown in FIGURE 3 is made of a material having some resiliency such that the swivel ball 24 can be pulled out of its "nesting" position in the bracket and replaced at will. When the charger 18 is permanently mounted, a simple means such as a clamp 45 is added that securely holds the charger substantially immovable when it is not in use. The clamp may be such as the toggle clamp Model HLC–600 manufactured by the Lapeer Manufacturing Co., Lapeer, Mich. With the clamp appropriately positioned, the charger 18 is rotated to a stowed position in which, with the clamp closed, it is securely locked.

In operation of the invention, a ground support serviceman rolls a tank (not shown) of high pressure gas, for instance dry air or nitrogen, up to the side of the aircraft 10. A flexible hose 40 which is already attached to a standard valve (not shown) on the top of the tank is coupled to the mounted charger 18. The standard valve on the top of the tank is then opened which releases gas into the flexible hose 40 and the charger 18 as far as the trigger valve 35. As a means of inspecting the charger 18, momentarily depressing the trigger 36 lets a small amount of gas pass through the valve 35, through the check valve 34, through the chamber 20, and out of the nipple 27 to the atmosphere if all parts are functioning correctly. Having verified that the charger 18 is clear, it then is rotated in a path approximately parallel to the bracket 25 until the nipple 27 is opposite any one of the terminal ends 13. The charger 18 is then pushed toward the valve 15 of the selected terminal end 13 until the nipple 27 has engaged the valve and unseated the valve core 16. This action admits the accumulator pressure to the chamber 20, and the pressure may then be read on the gage 21. The pressure read on the gage is then compared with the label 37 over the valve 15. If the pressure is satisfactory, the charger 18 is pulled away from the first valve 15 and is rotated to a second position opposite another of the terminal ends 13 where the same engaging procedure is followed. If, on the other hand, the pressure in the engaged accumulator 11 is found to be too low, the trigger 36 is depressed and the gage 21 is observed until the pressure has been built up to the proper level; the trigger is then released and the charger 18 is disengaged as above. If the accumulator pressure is found to be too high, the bleed button 23 is depressed until the gage 21 indicates that the pressure has fallen off to the desired level; the bleed button is then released and the charger 18 is disengaged as above. After all of the accumulators 11 have been checked and serviced as needed, the flexible hose 40 is disconnected from the charger 18, and the charger is then rotated to its stowed position and secured with the clamp 45 so that it will not move relative to the aircraft 10 during flight, or, alternatively, completely removed from the aircraft.

Another embodiment of the invention is shown diagrammatically in FIGURES 5 and 6 in which all the terminal ends 13 of the tubes 12 are rigidly mounted in an arc of a circle at the charger 18A. An arm 47 is rotatably mounted in the rigid body 30A of the charger 18A having an internal cavity 54 in communication with a chamber 20A in the rigid body; said communication is provided by a circumferentially relieved surface or groove 56 on an internal portion of the arm, said surface being opposite an opening into the chamber 20A and having at least one radial passage 57 from the relieved surface through the arm to the cavity 54. Suitable sealing means, such as O-rings, (not shown) are provided for preventing the escape of gas from the charger 18A. The arm 47 has an external portion with a free end 49 and an orifice 53 which connects with the cavity 54; a gage 21 is mounted in the orifice and indicates the pressure in the cavity and the chamber 20A. A handle 19 having a cam 48 rigidly attached thereto is rotatably mounted on the free end 49 of the arm 47. The handle 19 is rotatable to a stowed position in which it lies alongside the arm 47; a small protuberance 52 on the handle mates with a small cavity 50 on the arm 47 holding the handle substantially immovable until it is rotated away from this stowed position. When the handle 19 is held in its stowed position by the protuberance 52 and cavity 50, a lip 55 on the handle bears against the rigid body 30A of the charger 18A holding the arm 47 substantially immovable relative to the rigid body by virtue of friction between the lip and the body. The handle 19 may be readily forced out of its stowed position and rotated upward to release the arm 47 and allow it to rotate relative to the rigid body 30A. The handle 19 may be further rotated away from its stowed position alongside the arm 47 to a position in which the cam 48 bears against, depending upon the position of arm 47, any one of a plurality of exposed parts or faces 28A of the spring-loaded cores 16A in a plurality of individual valve assemblies 15A, each of which controls the flow of gas from its respective terminal end 13 of a tube 12.

The rigid body 30A has a first passage 33A which opens into the chamber 20A; said passage contains a first manually controlled valve element 35A which is held in a normally closed position by a resilient means such as a spring. Said valve element 35A lies between a flexible hose 40 which is connected to an external source of high pressure gas (not shown) and the chamber 20A; actuating the valve element is accomplished by depressing a "charge" button 22 or the equivalent on the surface of the rigid body 30A.

A second passage 42A provides selective communication between the cavity 54 in the arm 47 and the exterior of the charger 18A; said passage contains a second manually controlled valve element 41A which is held in its normally closed position by a resilient means such as a spring. Said valve element 41A is moved to its open position in which gas in the chamber 20A is vented to the atmosphere by depressing a "bleed" button 23A or the equivalent on the surface of the rigid body 30A.

An identifying label 37 is attached near each terminal end 13, as in the first embodiment of the invention, to provide information concerning the pressure that should be attained in the accumulator 11 at the other end of the tube 12.

In operation of this embodiment of the invention, the charger 18A is rigidly mounted on the aircraft 10 at a predetermined, accessible location. The terminal ends 13 of the plurality of tubes 12 are permanently connected to the charger 18A at locations around the periphery of the rigid body 30A. An external source of high pressure gas (not shown) is also connected to the charger 18A through a flexible tube 40. The handle 19 is pulled away from its stowed position alongside the arm 47, and the arm 47 is rotated until the cam 48 is aligned with a selected one of the terminal ends 13. The handle 19 is then further rotated until the cam 48 bears against the face 28A of the stem or core 16A causing the base 29A to be unseated. When the base 29A is unseated, gas from the selected tube 12 fills the arms of the chamber 20A and the cavity 54; the pressure of this gas, as indicated by the gage 21, is compared with the design pressure shown on the label 37. If the indicated pressure is too low, gas is transferred, as required, from the external source of high pressure gas to the chamber 20A by pressing the charge button 22 which opens the valve element 35A. If the indicated pressure is too high, gas is vented as required from the chamber 20A to the atmosphere by pressing the bleed button 23A. If the indicated pressure is found to be satisfactory, the handle 19 is rotated upward, allowing the core 16A to seal off the accumulator 11 and its tube 12 from the common charger 18A. The arm 47 is then rotated until it is aligned with the second, selected terminal end 13, and then the third and the fourth, etc., at each of which the same procedure of engaging, checking, regulating, and sealing is employed until all of the accumulators have been serviced.

While only one embodiment of the invention, together with a modification thereof, has been described in detail herein and shown in the accompanying drawing, it will be evident that various further modifications are possible in the arrangement and construction of its components without departing from the scope of the invention.

I claim:

1. The method of checking and regulating from one location the gas pressure in each of a plurality of containers mounted in diverse locations within an aircraft, said method comprising the steps of:
    selectively and singularly coupling each of said containers with a common charging device mounted at a fixed location in the aircraft;
    determining the gas pressure in each selected container by determining the gas pressure in the charging device while the charging device is connected to each selected container;
    interchanging gas between each said container and the common charging device, while each container is connected to the charging device, for adjusting gas pressure in each container to a desired value;
    disconnecting each container, after adjusting the gas pressure therein to said desired value, from the common charging device;
    sealing each container as the same is disconnected from the charging device;
    and inspecting the charging device for evidence of contamination after disconnecting a container, whereby the pressure of contaminated gas in a given container is determinable while said contaminated container remains isolated from each of the other containers.

2. The method of checking and regulating from one location the gas pressure in each of a plurality of containers mounted in diverse locations within an aircraft, said method comprising the steps of:
    temporarily mounting a common charging device at a fixed location in the aircraft;
    selectively and singularly coupling each of said containers with the common charging device;
    determining the gas pressure in each selected container by determining the gas pressure in the charging device while the charging device is connected to each selected container;
    interchanging gas between each said container and the common charging device, while each container is connected to the charging device, for adjusting gas pressure in each container to a desired value;
    disconnecting each container, after adjusting the gas pressure therein to said desired value, from the common charging device;
    sealing each container as the same is disconnected from the charging device;
    inspecting the charging device for evidence of contamination after disconnecting a container, whereby the pressure of contaminated gas in a driven container is determinable while said contaminated container remains isolated from each of the other containers;
    and removing said common charging device from the aircraft.

3. Apparatus for selectively checking and regulating from one location the gas pressure in each of a plurality of pressurized containers mounted in diverse locations within an aircraft, said apparatus comprising:
    a plurality of tubes, each of said tubes having one end in communication with a respective one of said containers and a terminal end rigidly mounted at a predetermined location within said aircraft in proximity with and in symmetry with the corresponding terminal ends of the others of said tubes;
    individual valve means regulating the flow of gas through each of said terminal ends;
    an external source of high pressure gas;
    charger means mounted at said predetermined location and having at least an element thereof movable with respect to the individual valve means for placing said element in register with the individual valve means, and the charger means further having a chamber formed therein;
    means for selectively and singularly actuating the valve means of each selected terminal end to place gas in the corresponding pressurized container in communication with gas in said chamber;

means for indicating the gas pressure in said chamber;

and means for regulating the gas pressure in said chamber, said means including means selectively providing communication between said chamber and said external source of high pressure gas.

4. The apparatus recited in claim 3, said charger means being permanently mounted on said aircraft; and said apparatus further having means for securely holding elements of said charger means substantially immovable when said charger means is not in use.

5. The apparatus recited in claim 3, said means for regulating gas pressure in said chamber comprising a first valve operable for adding gas to said chamber from said external source of high pressure gas, and a second valve operable for removing gas from said chamber.

6. Apparatus for selectively checking and regulating from one location the gas pressure in each of a plurality of pressurized containers mounted in diverse locations within an aircraft remote from said one location, said apparatus comprising:

a plurality of tubes, each of said tubes having one end in communication with a respective one of said containers and a terminal end rigidly mounted at a predetermined location within said aircraft in proximity with and in symmetry with the corresponding terminal ends of the others of said tubes;

individual valve means regulating the flow of gas through each of said terminal ends;

an external source of high pressure gas;

charger means mounted at said predetermined location and having at least an element thereof movable with respect to the individual valve means for placing said element in register with the individual valve means, and the charger means further having a chamber formed therein and having a first passage for admitting gas from said external source to said chamber and a second passage for releasing gas from said chamber to the atmosphere;

means for selectively and singularly actuating the valve means of each selected terminal end to place gas of the corresponding pressurized container in communication with gas in said chamber;

means for indicating the gas pressure in said chamber;

means for transferring gas from said external source to said chamber;

and means for venting gas from said chamber to the atmosphere.

7. Apparatus for selectively checking and regulating from one location the gas pressure in each of a plurality of pressurized containers mounted in diverse locations within an aircraft remote from said one location, said apparatus comprising:

a plurality of tubes, each of said tubes having one end in communication with a respective one of said containers and a terminal end rigidly mounted at a predetermined location within said aircraft in proximity with and in symmetry with the corresponding ends of the others of said tubes;

individual valve means regulating the flow of gas through each of said terminal ends;

an external source of high pressure gas;

charger means movably mounted at said predetermined location for selectively moving said charger into registration with the individual valve means, and having a chamber formed therein and having a first passage for admitting gas from said external source to said chamber and a second passage for releasing gas from said chamber to the atmosphere;

means for selectively actuating the valve means of each terminal end to allow gas from said selected terminal end and the associated one of said tubes to fill said chamber;

means for indicating the gas pressure in said chamber;

and means for regulating the gas pressure in said chamber.

8. Apparatus for selectively checking and regulating from one location the gas pressure in each of a plurality of pressurized containers mounted in diverse locations within an aircraft remote from said one location, said apparatus comprising:

a plurality of tubes, each of said tubes having one end communicating with a respective one of said containers and a terminal end rigidly mounted at a predetermined location with said aircraft in proximity with and in symmetry with the corresponding ends of the others of said tubes;

individual valve means regulating the flow of gas through each of said terminal ends;

an external source of high pressure gas;

charger means movably mounted at said predetermined location and having a chamber formed therein;

rigid means having a portion external to said charger for selectively coupling the terminal end of each of said tubes with said chamber and for actuating the valve means of a selected terminal end to allow gas from said selected terminal end and the associated tube to fill said chamber;

means for indicating the gas pressure in said chamber;

and means for regulating the gas pressure in said chamber.

9. Apparatus for selectively checking and regulating from one location the gas pressure in each of a plurality of pressurized containers mounted in diverse locations within an aircraft remote from said one location, said apparatus comprising:

a plurality of tubes, each of said tubes having one end communicating with a respective one of said containers and a terminal end rigidly mounted at a predetermined location within said aircraft in proximity with and in symmetry with the corresponding terminal ends of the others of said tubes;

individual valve means regulating the flow of gas through each of said terminal ends;

an external source of high pressure gas;

and a charger movably mounted on said aircraft at said predetermined location, said charger having a rigid, elongated body with two ends, one end being movably mounted on said aircraft and the other end having a shape that can be grasped conveniently by a person's hand and controllably moved, a chamber in said body, an element for selectively coupling said chamber with any one of said tube terminal ends, said element actuating the valve means of a selected terminal end upon coupling, whereby gas from said selected end fills said chamber, means for indicating the gas pressure in said chamber, and means for regulating the gas pressure in said chamber coupled with said selected tube terminal end.

10. Apparatus for selectively checking and regulating from one location the gas pressure in each of a plurality of pressurized containers mounted in diverse locations within an aircraft remote from said one location, said apparatus comprising:

a plurality of tubes, each of said tubes having one end thereof communicating with a respective one of said containers and a terminal end rigidly mounted at a predetermined location within said aircraft in proximity with and in symmetry with the corresponding terminal ends of the others of said tubes;

individual valve means regulating the flow of gas through each of said terminal ends;

an external source of high pressure gas;

and a charger movably mounted on said aircraft at said predetermined location, said charger having a rigid, elongated body with two ends, one end being movably mounted on said aircraft and the other end having a shape that can be grasped conveniently by a person's hand and controllably moved, a chamber in said body, a rigid nipple having a bore and being externally located between the two said body ends for selective engagement with any one of said tube terminal ends, said nipple actuating the valve means of a selected terminal end upon engagement, an orifice in said body connecting with the bore of said nipple and providing communication between said engaged terminal end and said chamber, means for indicating the gas pressure in said chamber, and means for regulating the gas pressure in said chamber while engaged with said selected one of said tube terminal ends.

11. Apparatus for selectively checking and regulating from one location the gas pressure in each of a plurality of pressurized containers mounted in diverse locations within an aircraft remote from said one location, said apparatus comprising:

a plurality of tubes, each of said tubes having one end communicating with a respective one of said containers and a terminal end rigidly mounted at a predetermined location within said aircraft in an arc of a circle together with the corresponding terminal ends of the others of said tubes, all of said terminal ends being similarly oriented;

individual valve means regulating the flow of gas through each of said terminal ends;

an external source of high pressure gas;

and a charger pivotally mounted on said aircraft at said predetermined location, said charger having
a rigid, elongated body with two ends, one end being pivotally mounted on said aircraft and the other end having a shape that can be grasped conveniently by a person's hand and controllably moved parallel to and perpendicular to the plane of said terminal ends, a chamber in said body, a rigid nipple having a bore and externally located between the two said body ends whereby rotating said body about the pivot point moves said nipple in a path corresponding to said arc of a circle on which said terminal ends lie for selective engagement with any one of said terminal ends, said nipple actuating the valve means of a selected terminal end upon engagement, a passage connecting with the bore of said nipple and providing communication between said engaged terminal end and said chamber, means for indicating the gas pressure in said chamber, and means for regulating the gas pressure in said chamber engaged with a selected one of said terminal ends.

12. The apparatus recited in claim 11, said charger being both pivotally and permanently mounted on the aircraft, and said apparatus further having a means for securely stowing said charger when it is not in use.

13. Apparatus for selectively checking and regulating from one location the gas pressure in each of a plurality of pressurized containers mounted in diverse locations within an aircraft remote from said one location, said apparatus comprising:

a plurality of tubes, each of said tubes having one end communicating with a respective one of said containers and a terminal end rigidly mounted at a predetermined location within said aircraft in proximity with and in symmetry with the corresponding ends of the others of said tubes;

individual valve means lying in a plane and regulating the flow of gas through each of said terminal ends;

charger means rigidly mounted at said predetermined location and having a chamber formed therein;

actuating means in said charger being movable parallel to and perpendicular to the plane of the valve means for selectively coupling the terminal end of each of said tubes with said chamber by actuating the valve means of any selected one of the terminal ends to allow gas from said selected terminal end and the corresponding tube to fill said chamber;

means for indicating the gas pressure in said chamber;

an external source of high pressure gas;

means for transferring gas from said external source to said chamber;

and means for venting gas from said chamber to the atmosphere.

14. The apparatus of claim 13, said terminal ends being arranged in an arc of a circle and said charger comprising a body containing said chamber, said actuating means in said charger comprising:

an arm mounted on said body for rotation about the center of said circle and having a free end;

a cam rotatably mounted on said free end of said arm and movable on said arc, by rotating said arm, to lie over any selected one of the individual valve means;

a handle connected to and rotatable with the cam and movable between a position in which the cam actuates any selected one of the individual valve means when the cam lies over the same and a second, stowed position;

and means for releasably holding said handle in said stowed position.

References Cited

UNITED STATES PATENTS

| | | | |
|---|---|---|---|
| 1,797,591 | 3/1931 | Sartakoff | 73—420 |
| 1,871,075 | 8/1932 | Mott et al. | 141—83 |
| 2,212,379 | 8/1940 | Smith | 141—349 X |
| 2,213,539 | 9/1940 | Wiegand | 73—146.4 X |
| 2,760,513 | 8/1956 | Trevaskis | 137—227 |

FOREIGN PATENTS

| | | |
|---|---|---|
| 331,071 | 12/1920 | Germany. |
| 552,804 | 6/1932 | Germany. |
| 190,814 | 1/1923 | Great Britain. |
| 499,911 | 1/1939 | Great Britain. |

M. CARY NELSON, *Primary Examiner.*

S. SCOTT, *Assistant Examiner.*